May 26, 1936.  E. A. KLIEWER  2,041,935
FRICTION BRAKE
Filed Dec. 8, 1934
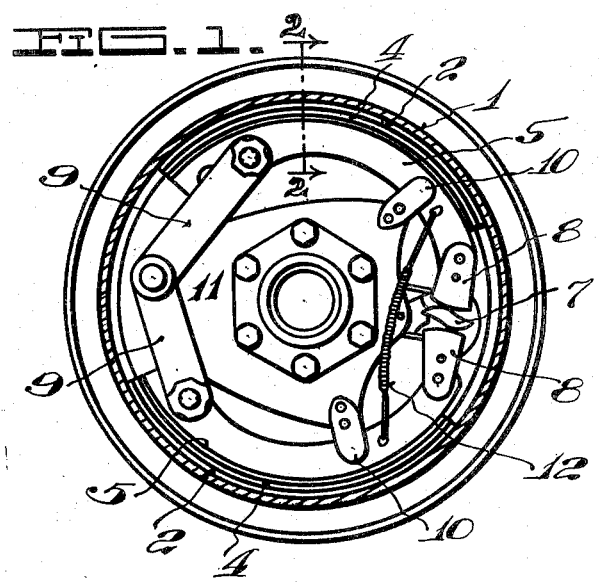
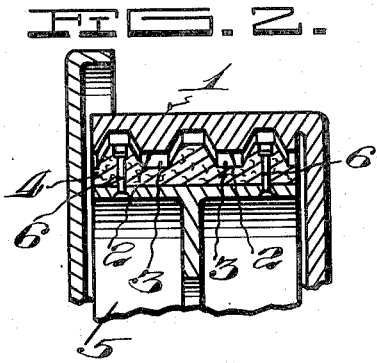
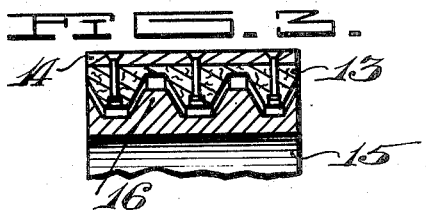
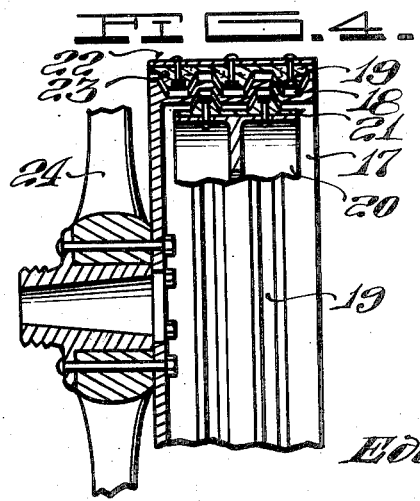
Edward A. Kliewer
INVENTOR
ATTORNEY Patented May 26, 1936

2,041,935

UNITED STATES PATENT OFFICE 2,041,935

FRICTION BRAKE

Edward A. Kliewer, Longview, Tex., assignor of one-half to R. W. Fair, Tyler, Tex., and one-sixteenth to Delta Drilling Company, Longview, Tex.

Application December 8, 1934, Serial No. 756,658

1 Claim. (Cl. 188—78)

This invention relates to friction brakes and it has particular reference to automobile brakes.

The principal object of the invention is to provide greater friction area than is afforded in conventional types of friction brakes, thereby giving the driver of a motor vehicle better control of a vehicle and enabling him to come to a dead stop in less time than is required with present types of friction brakes. The invention further aims to provide a friction brake which is useful also in handling heavy tools and equipment in drilling wells and in many other cases where braking mechanism is employed.

With the foregoing objects as paramount, the invention has particular reference to its salient features of construction and arrangement of parts which will become manifest as the description proceeds, taken in connection with the accompanying drawing, wherein:—

Figure 1 is an elevation of a well known type of braking mechanism in which the friction elements of the invention are installed.

Figure 2 is a fragmentary section on lines 2—2 on Figure 1.

Figure 3 is a fragmentary section showing the modified form of the invention shown in Figure 2, and Figure 4 is a fragmentary view of a vehicle wheel showing both internal and external friction elements.

Continuing with a more detailed description of the drawing, reference is primarily made to Figure 1 wherein is shown the mechanism of a conventional type of brake. The brake drum 1 of the present invention is internally constructed to provide a series of annular ribs 2. These ribs are received in complementary grooves 3 of the brake lining or friction element 4, the latter being secured to the brake shoes 5 by means of the rivets 6.

Describing the operation of the particular type of the brake mechanism shown in Figure 1, 7 designates a cam, rotation or oscillation of which will urge the elements 8 in opposite directions to divert an outward force against the brake shoes 5. This outward movement is made uniform through the length of the shoes 5 by the pivoted links 9 diametrically opposite the cam 7. The members 10 are provided to guide the shoes 5 and are secured to the center plate 11. The spring 12 returns the shoes 5 to their normal position after having been displaced to bring about braking action.

It is understood that the invention is not limited to use on the specific type of brake shown in Figure 1 nor is it intended to limit the invention to vehicle brakes specifically, it being obvious that the invention may be applied effectively on friction drives, clutch mechanism and the like where maximum friction surface is necessary or desired.

In Figure 3 is shown a slightly modified arrangement inasmuch as the friction element or lining 13 is secured to a brake band 14 to provide for an externally expanding and contracting brake. The internal element 15 is provided with annular ribs 16, which have the same appearance as a truncated cone in transverse section and these ribs cooperate with the ribbed lining 13 to produce a servo braking effect.

In Figure 4 is shown identically the same principle embraced in the structure just described and is applied to that type of brake utilizing the contracting and expanding elements. In this case, the drum 17 is corrugated to produce annular recesses and alternate ribs 18 and 19 respectively. The internal expanding element or shoe 20 is provided with a lining 21 having annular ribs corresponding to the annular recesses in the drum 17. The cooperation of the ribs with the recesses is such that a self-energizing braking action is obtained, in excess of the action of a shoe on a drum such as in conventional brake mechanism. This is true also of the external friction element which is comprised of the band 22 having a lining 23 substantially the same in construction as the friction surface 21 on the shoe 20 of the hand or emergency brake. The grooves or corrugated drum 17 is affixed in the conventional manner to the vehicle wheel 24.

It is evident from the foregoing that with the greater friction area afforded by the grooves, complementary friction elements, a self-energized braking action is obtained inasmuch as the friction between the elements becomes increasingly greater yet without requiring a mechanical force in excess of that ordinarily required to actuate the conventional type of friction brake.

Manifestly, the construction shown is capable of considerable modification and such modification as is considered within the scope and meaning of the appended claim is also considered within the spirit and intent of the invention.

What is claimed is:

In a vehicle brake, the combination comprising a brake band having a smooth inner periphery, a lining element composed of a single piece of heat resisting material having a smooth outer surface conforming to the inner periphery of said band and affixed thereto, the inner surface of said lining element having equidistantly spaced grooves circumferentially disposed around the same, a brake drum having a circumferentially corrugated annular flange, the corrugations of which correspond to the grooves of said lining element and a second lining element having circumferential grooves corresponding to the corrugations of said drum flange in a like manner to said first lining element, said elements and said flange being in concentric relationship whereby expansion and contraction of the lining elements will effect frictional engagement thereof with the said drum flange.

EDWARD A. KLIEWER.